United States Patent
Boyle et al.

(10) Patent No.: US 12,522,174 B2
(45) Date of Patent: Jan. 13, 2026

(54) SYSTEM AND METHOD FOR VERIFYING PROPER USAGE OF PASSENGER RESTRAINTS

(71) Applicant: Disney Enterprises, Inc., Burbank, CA (US)

(72) Inventors: Bryant D. Boyle, Montverde, FL (US); Gary D. Markowitz, San Juan Capistrano, CA (US); Clifford Aron Wilkinson, Clermont, FL (US); Ching-Chien Chen, Arcadia, CA (US); Gregory Brooks Hale, Orlando, FL (US); Jeremy Eaton, Winter Garden, FL (US)

(73) Assignee: Disney Enterprises, Inc., Burbank, CA (US)

( * ) Notice: Subject to any disclaimer, the term of this patent is extended or adjusted under 35 U.S.C. 154(b) by 102 days.

(21) Appl. No.: 18/507,043

(22) Filed: Nov. 11, 2023

(65) Prior Publication Data
US 2025/0153679 A1    May 15, 2025

(51) Int. Cl.
*B60R 22/48* (2006.01)
*G06V 20/59* (2022.01)

(52) U.S. Cl.
CPC ...... *B60R 22/48* (2013.01); *B60R 2022/4825* (2013.01); *G06V 20/59* (2022.01); *G06V 20/593* (2022.01)

(58) Field of Classification Search
CPC .......... B60R 22/48; G06K 9/00; G06N 20/00; B60W 40/08; B60W 40/09; B60W 50/00; B60W 50/12; B60W 50/14; G06V 20/40; G06V 20/41; G06V 20/59; G06V 20/591
See application file for complete search history.

(56) References Cited

U.S. PATENT DOCUMENTS

| 5,529,382 A | 6/1996 | Burkat |
| 6,554,318 B2 | 4/2003 | Kohut et al. |
| 9,346,429 B2 | 5/2016 | Sutherland |

(Continued)

FOREIGN PATENT DOCUMENTS

WO    WO-2024/186475 A1    9/2024

OTHER PUBLICATIONS

Alvarez Oviedo, et al., "Design of a System for Driver Drowsiness Detection and Seat Belt Monitoring Using Raspberry Pi 4 and Arduino Nano," Designs 9(1):11, 19 pages (2025).

*Primary Examiner* — Van T Trieu
(74) *Attorney, Agent, or Firm* — Foley & Lardner LLP

(57) ABSTRACT

A restraint verification platform may obtain video data video data of a passenger in a passenger seat. The restraint verification platform may analyze the video data using one or more machine learning models trained to detect passengers in passenger seats and passenger restraints of the passenger seats. The restraint verification platform may detect, using the one or more machine learning models and based on analyzing the video data, the passenger in the passenger seat and a passenger restraint of the passenger seat. The restraint verification platform may determine, based on analyzing the video data, that the passenger restraint is not properly securing the passenger. The restraint verification platform may perform an action based on determining that the passenger restraint is not properly securing the passenger.

19 Claims, 8 Drawing Sheets

(56) References Cited

U.S. PATENT DOCUMENTS

| | | |
|---|---|---|
| 9,744,930 B2 | 8/2017 | Howard |
| 10,137,856 B1 | 11/2018 | Jimenez et al. |
| 10,213,701 B2 | 2/2019 | Howard |
| 10,471,930 B2 | 11/2019 | Thomas et al. |
| 11,661,028 B2 | 5/2023 | Liau |
| 12,194,956 B1 | 1/2025 | Nadgir et al. |
| 2021/0394710 A1* | 12/2021 | Hu ................. B60W 40/09 |
| 2025/0042355 A1* | 2/2025 | Thomas ............ B60R 22/48 |
| 2025/0050836 A1 | 2/2025 | Thomas et al. |

\* cited by examiner

SYSTEM AND METHOD FOR VERIFYING PROPER USAGE OF PASSENGER RESTRAINTS

BACKGROUND

Passenger restraints are safety devices used to safely secure passengers within seats of vehicles. For example, in the automotive industry, a seat belt is used to safely secure a driver or a passenger within a seat of an automobile. Similarly, in the airline industry, a seat belt is used to safely secure a pilot or a passenger within a seat of an airline. Passenger restraints may be adjusted to accommodate passengers of different sizes.

SUMMARY

A method performed by a restraint verification platform, the method comprising: obtaining video data of a passenger in a passenger seat of a passenger vehicle; analyzing the video data using one or more machine learning models trained to detect passengers in passenger seats and passenger restraints of the passenger seats; detecting, using the one or more machine learning models and based on analyzing the video data, that the passenger is in the passenger seat and a passenger restraint of the passenger seat; determining, based on analyzing the video data, that the passenger restraint is not properly securing the passenger; and performing an action based on determining that the passenger restraint is not properly securing the passenger.

A system comprising: one or more camera devices configured to obtain video data of a passenger in a passenger seat of a passenger vehicle; and a restraint verification platform is configured to: obtain the video data; analyze the video data using one or more machine learning models trained to detect passengers in passenger seats and passenger restraints of the passenger seats; detect, using the one or more machine learning models and based on analyzing the video data, the passenger in the passenger seat and a passenger restraint of the passenger seat; determine, based on analyzing the video data, that the passenger restraint is not properly securing the passenger; and perform an action based on determining that the passenger restraint is not properly securing the passenger.

A non-transitory computer-readable medium storing a set of instructions, the set of instructions comprising: one or more instructions that, when executed by one or more processors of a device, cause the device to: obtain video data of a passenger in a passenger seat of a passenger vehicle; analyze the video data using one or more machine learning models trained to detect the passenger in the passenger seat and a passenger restraint of the passenger seat; detect, using the one or more machine learning models and based on analyzing the video data, the passenger in the passenger seat and the passenger restraint of the passenger seat; determine, based on analyzing the video data, that the passenger restraint is not properly securing the passenger; and perform an action based on determining that the passenger restraint is not properly securing the passenger.

DETAILED DESCRIPTION

Figure 1A:
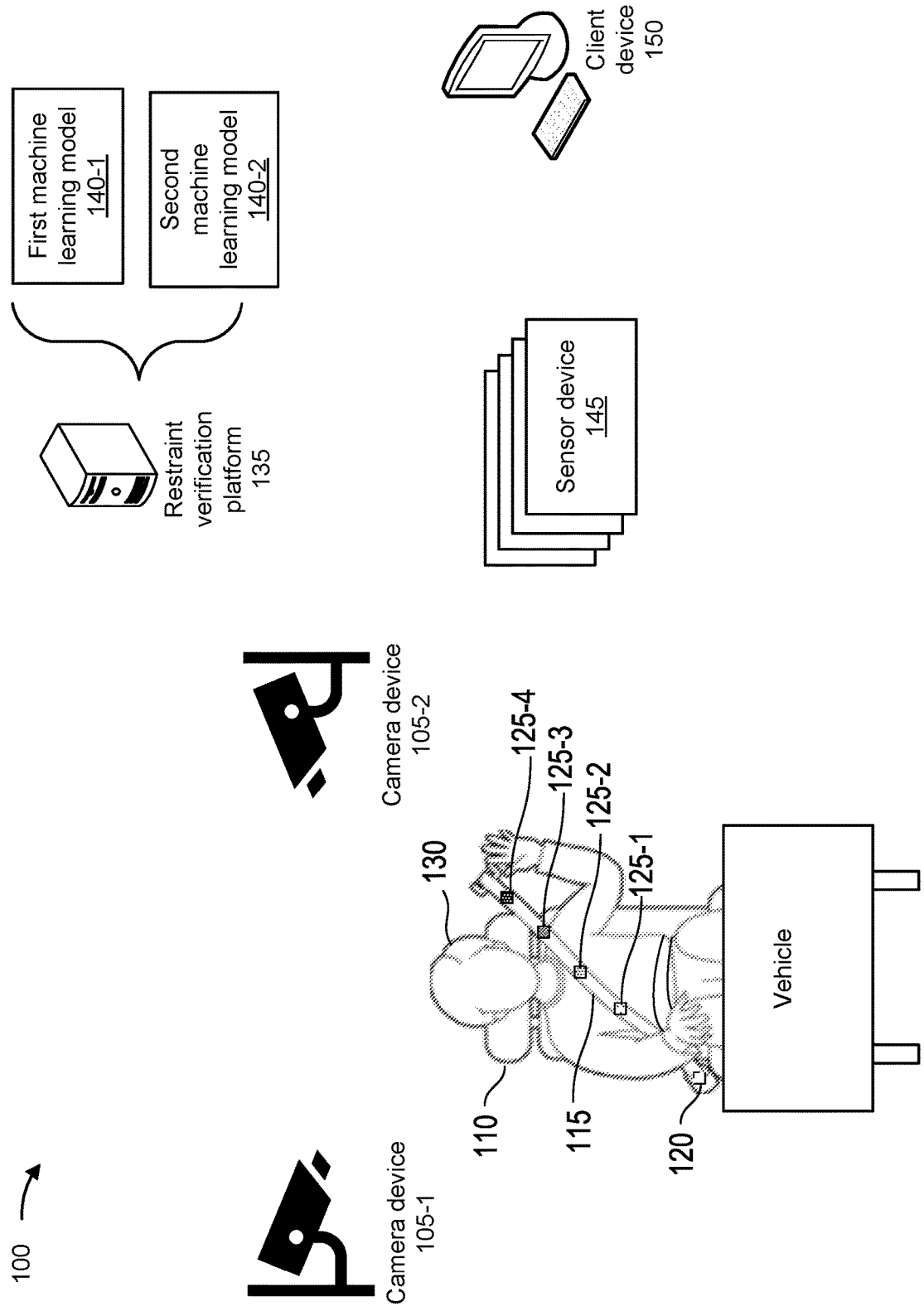
FIGS. 1A-1E are diagrams of an example implementation described herein.

The following detailed description of example implementations refers to the accompanying drawings. The same reference numbers in different drawings may identify the same or similar elements.

A passenger restraint is a safety device used to safely secure a passenger within a vehicle. For example, in the amusement park industry, a seat belt may be used to restrain the passenger safely and securely within a seat of the vehicle, thereby restraining the passenger from standing up or leaving the vehicle while the vehicle is in motion. Typically, prior to the vehicle being in motion, the passenger may be provided instructions regarding the manner in which the seat belt is to be properly used to safely secure the passenger within the vehicle.

In some instances, the passenger may not comprehend the instructions for proper use of the seat belt and, accordingly, the passenger may improperly use the seat belt and thereby not properly secure themselves in the vehicle. An example of improper use of the seat belt by the passenger includes the passenger inadvertently sitting on the seat belt. Another improper use of the seat belt by the passenger includes the passenger excessively extending the seat belt such that the seat belt does not secure the passenger in the vehicle. A portion of the excessively extended seat belt may be intentionally obstructed by the passenger to prevent an operator of the vehicle from discovering the improper use.

Currently, prior to the vehicle being in motion in an amusement, the operator (e.g., a ride operator) visually inspects the passenger and the seat belt to ensure that the seat belt is properly used and to ensure that the seat belt is safely securing the passenger. While operators are quite skilled at this task of inspecting the passenger and the seat belt, this task is a time-consuming due to the number of passengers and seat belts to inspect and/or due to the level of attention required by the operator to check the details needed to perform this task.

Additionally, or alternatively, operators may not always easily detect certain improper uses of the seat belt (e.g., that the passenger is inadvertently sitting on the seat belt). Additionally, or alternatively, operators may not always easily detect that the seat belt has been excessively extended. Additionally, or alternatively, operators may not always easily detect that the passenger has unbuckled the seat belt after the vehicle is in motion.

Currently, a first sensor device may be used to detect whether the passenger is seated on a seat of the vehicle. Additionally, or alternatively, a second sensor device may be used to detect whether the seat belt of the seat has been buckled. However, the sensor devices are not configured to detect whether the passenger is inadvertently sitting on a buckled seat belt and/or whether a buckled seat belt has been excessively extended.

Accordingly, a need exists for a system to facilitate the task of inspecting the passenger and the seat belt to ensure that the seat belt is properly used prior to the vehicle being in motion and to ensure that the seat belt is safely securing the passenger prior to and subsequent to the vehicle being in motion.

Implementations described herein are directed to a system that uses the analysis of video data and uses the analysis of additional data to determine whether a passenger restraint is properly used to safely secure a passenger in a vehicle. The analysis of video data may be referred to as "video analytics." The additional data may include data from a seat sensor device, from a distance sensor device (or a proximity sensor device), a clasping sensor device, among other examples. As an example, the clasping sensor device may generate data indicating whether the passenger restraint is locked and secured (e.g., data indicating whether the seat belt is buckled).

Currently, the analysis of video data is subject to the visibility of items in a scene captured by the video data. In other words, the effectiveness of the analysis of the video data may be limited by items that are poorly visible or are invisible. In this regard, such items may be monitored by human operators or monitored by separate monitoring systems such as proximity sensor devices, among other examples. Implementations described herein address the need to augment a scene to account for items that are poorly visible or are invisible (in the video data) by combining the video analytics and the analysis of the additional data.

As used herein, a "passenger" may be broadly used to refer to a passenger of an automobile, a passenger of an aircraft, a passenger of a ride vehicle, among other examples. Accordingly, implementations described are applicable to various industries, such as the automotive industry, the aviation industry, the amusement park industry, among other examples. As used herein, a "passenger restraint" may be broadly used to refer to a seat belt, an over-the-shoulder restraint, a vest restraint, among other examples.

In some examples, the passenger restraint may include a seat belt. In this regard, the system described herein may analyze the video data to determine an amount of visible seat belt (e.g., an amount of the seat belt that is visible). In some situations, the system may use linear algebra projection methods to determine the amount of visible seat belt. In addition to determining the amount of visible seat belt, the system may obtain data that indicates an amount of seat belt extended (e.g., a length of the seat belt extended). The data may be obtained from a device associated with the seat belt. As an example, the device may be a rotary encoder device. The rotary encoder device may be a device that converts angular position or motion to output signals corresponding to a length of the seat extended.

The system may compare the amount of visible seat belt and the amount of seat belt extended to determine whether the seat belt is properly used to properly secure the passenger in the passenger seat. For example, based on the comparison, the system may determine whether the amount of visible seat belt corresponds to the amount of seat belt extended. For instance, if the system determines that the amount of seat belt extended exceeds the amount of visible seat belt, the system may determine that the seat belt has been excessively extended. In other words, the system may determine that the seat belt has been excessively extended if the length of the seat belt extended exceeds a length corresponding to the amount of visible seat belt.

In some examples, the seat belt may include visual indicators that may be used to facilitate the analysis of the video data to determine the amount of visible seat belt. In some examples, the visual indicators may include infrared (IR) material, such an IR tape. The system may be used with different seat belt shapes and/or with passengers of different sizes to prevent the seat belt from being excessively extended.

In some examples, the system may provide a notification to an operator of the vehicle if the system determines that the seat belt is not properly securing the passenger (e.g., because the seat belt has been excessively extended). Additionally, or alternatively, the system may provide a notification to the operator if the system determines that the passenger is secured by the passenger restraint within a particular period of time after receiving instructions to be secured by the passenger restraint. Additionally, or alternatively, the system may provide a notification to the operator if the system determines that the passenger is no longer secured by the passenger restraint after receiving instructions to be secured by the passenger restraint.

One advantage of comparing the amount of visible seat belt and the amount of seat belt extended is the ability to readily determine that the seat belt has been excessively extended. Accordingly, the system is an improvement over current visual inspection by the operator. Additionally, the system compliments the responsibility of the operator to ensure the passenger is properly secured.

As explained herein, the system may combine video analytics in conjunction with data from additional devices, such as a seat sensor device, a distance sensor device (or a proximity sensor device), a clasping sensor device, among other examples. For example, based on the video analytics, the system may verify the accuracy of data from the additional devices. For instance, based on the video analytics, the system may verify that the passenger is the seat of the vehicle, verify that the passenger restraint is in a position that secures the passenger in the vehicle, and verify that the passenger restraint is properly being used (e.g., to safely secure the passenger in the vehicle).

As an example, based on the video analytics, the system may determine whether data from the seat sensor device is accurate by verifying that the passenger is seated in the seat if the data indicates that the passenger is seated in the seat. In other words, the system may compare the video data and the data from the seat sensor device. Similarly, based on the video analytics, the system may determine whether data from the clasping sensor device is accurate by verifying that the passenger restraint is in a position to secure the passenger if the data indicates that the passenger restraint is in the position.

In some examples, the system may generate scores for the additional devices. For instance, the score for a particular device may indicate a measure of accuracy of data provided by the particular device. The score may be generated based on the video analytics (e.g., based on analyzing a set of images related to the device). By verifying the measure of accuracy of the data provided by the additional devices, the system may determine whether the additional devices are functioning properly. For example, the system may determine whether the additional devices are experiencing faults based on verifying the measure of accuracy. For instance, the system may determine that the particular device is experiencing a fault based on the score. In some situations, by verifying the measure of accuracy of the data provided by the additional devices, the system may determine whether the additional devices are providing data that is accurate (without determining that the additional devices are experiencing faults). Additionally, or alternatively, by verifying the measure of accuracy of the data provided by the additional devices, the system may determine whether the additional devices are providing data that corresponds to the video data (e.g., determine whether the data indicates that the passenger is seated in the seat if the video data indicates that the passenger is seated in the seat, determine whether the data indicates that the passenger restraint is in a position to secure the passenger if the video data indicates that the passenger restraint is in a position to secure the passenger, and so on). In this regard, the system may provide a notification to the operator to cause the particular device to be serviced or replaced.

In some situations, the vehicle may be subject to a minimum closure lock for the passenger restraint. In this regard, the size of the passenger may prevent the operator from confirming that the passenger restraint has achieved the minimum closure lock. The minimum closure lock may not adequately secure the passenger due to the size of the passenger. The system described herein may use the visual analytics to detect a size of the passenger before the passenger boards the vehicle.

Based on detecting the size of the passenger, the system may determine that the minimum closure lock is compatible with the size of the passenger, or may determine that the passenger is to not board the vehicle. In this regard, the system may determine a corrective action, such as directing the passenger to a specific seat or informing the passenger that the vehicle is not appropriate for the passenger. The system may provide a notification of the corrective action to the operator.

As explained herein, the system may use data from multiple sources to determine whether the passenger is safely and properly secured by the passenger restraint. For example, the system may use the video analytics in conjunction with the data from the additional devices to facilitate the detection of improper use of the passenger restraint. The system may use the video analytics to verify that the passenger is in the seat in the vehicle, to directly monitor when the passenger has been secured with the passenger restraint, and to verify that the passenger restraint is being used as intended. The automatic process implemented by the system may complement the responsibility of the operator to ensure the passenger is adequately secured in the vehicle. While examples described herein are directed to a vehicle, implementations described herein are applicable to other machines or devices that move passengers or objects, such as a motion base. More generally, the present disclosure may be useful in any implementation where restraint monitoring is valuable including swing rides, tower rides, spinning rides and the like whether or not a vehicle is included.

FIGS. 1A-1E are diagrams of an example implementation 100 associated with verifying proper usage of passenger restraints. As shown in FIGS. 1A-1E, example implementation 100 includes camera devices 105-1, camera device 105-2, to camera device 105-N (collectively camera devices 105 and individually camera device 105), passenger seat 110 of a vehicle, a rotary encoder device 120, a restraint verification platform 135, a plurality of sensor devices 145 (individually sensor device 145), and client device 150.

The devices may be connected via a network that includes one or more wired and/or wireless networks. For example, the network may include Ethernet switches. Additionally, or alternatively, the network may include a cellular network, a public land mobile network (PLMN), a local area network (LAN), a wide area network (WAN), a private network, a controller area network (CAN) bus, the Internet, and/or a combination of these or other types of networks.

The network enables communication between camera devices 105, rotary encoder device 120, restraint verification platform 135, sensor device 145, and/or client device 150. Camera devices 105, rotary encoder device 120, restraint verification platform 135, sensor device 145, and/or client device 150 may be part of a system configured to verify proper usage of passenger restraints.

A camera device 105 may include one or more devices configured to capture video data of an environment that includes passenger seat 110. The camera device 105 may provide the video data to restraint verification platform 135. In some examples, the camera device 105 may be a monoscopic camera device (or a mono camera device). Alternatively, the camera device 105 may be a stereoscopic camera device (or a stereo camera device).

As shown in FIG. 1A, example implementation 100 may include multiple camera devices 105. Camera devices 105 are coupled by wired or wireless connections to restraint verification platform 135. Camera devices 105 may provide continuous video/audio streaming or alternatively intermittently stream based on operational needs, triggered programmatically or by motion sensors or other activity triggers. One or more camera devices 105 may be mounted on passenger seat 110 and/or offboard passenger seat 110. In some instances, the one or more camera devices 105 may be provided onboard at locations that are inaccessible to the operator. In some implementations, as the number of camera devices 105 increase, the video data may provide more information that may be used to determine whether passenger restraint 115 is properly securing passenger 130.

Passenger seat 110 may be included in a passenger seat of the vehicle. The vehicle may include an automobile, an aircraft, a watercraft, a ride vehicle of an amusement, among other examples. Passenger seat 110 may include a passenger restraint 115. As shown in FIG. 1A, passenger restraint 115 may include a seat belt. In some implementations, passenger restraint 115 may include a lap bar, an over-the-shoulder restraint, a vest restraint, a back restraint, a leg restraint, among other examples.

As shown in FIG. 1A, passenger seat 110 may include rotary encoder device 120. Rotary encoder device 120 may be configured to generate rotary data indicating an amount of seat belt extended. In other words, the rotary data may indicate a measured length of passenger restraint 115 extended. Rotary encoder device 120 may provide the rotary data to restraint verification platform 135 for analysis in conjunction with the video data.

As shown in FIG. 1A, passenger seat 110 may include a first visual indicator 125-1, a second visual indicator 125-2, a third visual indicator 125-3, and a fourth visual indicator 125-4 (collectively visual indicators 125 and individually visual indicator 125). A visual indicator 125 may be captured in the video data to indicate an amount of seat belt extended (e.g., a length of passenger restraint 115 that has been extended).

For example, first visual indicator 125-1 may indicate a first length when visible, second visual indicator 125-2 may indicate a second length (that exceeds the first length) when visible, third visual indicator 125-1 may indicate a third length (that exceeds the second length) when visible, and so on.

In some implementations, a visual indicator 125 may include an IR tape. Additionally, or alternatively, the visual indicator 125 may include a reflective material and/or a reflective color. Additionally, or alternatively, the visual indicator 125 may include a light emitting diode. Additionally, or alternatively, the visual indicator 125 may include an array of lights. As shown in FIG. 1A, a passenger 130 may be seated in passenger seat 110.

Restraint verification platform 135 include one or more devices configured to process video data to determine whether passenger restraint 115 is properly securing passenger 130 in passenger seat 110. As an example, restraint verification platform 135 may process the video data to detect improper use of passenger restraint 115. Processing the video data may include various algorithmic techniques to condition raw video data such that objects and features in the video data are more readily analyzed by later object recognition and machine learning models.

This processing may include filtering, adjusting brightness, contrast and color profiles as well as zooming, cropping, rotating and the like. The particular processes chosen and sequence of operations will be adapted to a particular environment and capabilities of camera devices 105.

For example, video from a dark environment may benefit from exposure and contrast enhancement, while video of a moving vehicle may benefit from rotational translation. In many examples algorithmic feature detection processes are also executed such as edge enhancement and detection processes, corner detection, blob detection, ridge detection and the like are used to as a part of object detection and scene analysis. Example detection techniques include Canny, Deriche, Sobel, Prewitt and/or Roberts edge detection, LoG, DoG, and DoH blob detection, Harris, Shi and Tomasi, level curve curvature corner detection, and Hough transform ridge detection.

Restraint verification platform 135 may be configured to provide a notification indicating whether passenger restraint 115 is properly and safely securing passenger 130 in passenger 110. As shown in FIG. 1A, restraint verification platform 135 may include a first machine learning model 140-1, a second machine learning model 140-1, and so on (collectively machine learning model 140).

First machine learning model 140-1 may be a machine learning model trained to detect and/or classify objects within an image, such as passenger seat 110, different portions of passenger restraint 115, body parts of passenger 130, among other examples. First machine learning model 140-1 may use raw or partially processed video or video frames as input, or may use features (edges, corners, blobs, ridges, and the like) that were identified previously. The body parts may include a head, a neck, shoulders, elbows, wrists, hips, knees, among other examples. First machine learning model 140-1 preferably takes context into account in its training and operation such that it is specifically trained to distinguish between passengers, passenger seats, and passenger restraints presented in its input.

In some implementations, first machine learning model 140-1 may implement one or more object recognition techniques. For example, first machine learning model 140-1 may detect and/or classify features within the video data, such as passenger 110, passenger restraint 115, body parts of passenger 130. For instance, first machine learning model 140-1 may implement a keypoint detection technique and/or a pose estimation technique, among other examples. Additionally, or alternatively, first machine learning model 140-1 may implement a convolutional neural network (CNN), a Single Shot MultiBox Detector (SSD) technique, and/or a You Only Look Once (YOLO) technique, among other examples.

In some implementations, first machine learning model 140-1 may implement one or more segmentation techniques to distinguish between passengers, passenger seats, and passenger restraints. For example, the one or more segmentation techniques may be used to divide an image into different regions based on different characteristics of pixels to identify objects or boundaries. In this regard, first machine learning model 140-1 may implement the one or more segmentation techniques to detect locations of passengers, passenger seats, and passenger restraints within an image.

In some implementations, first machine learning model 140-1 may implement one or more keypoint techniques. For example, the one or more keypoint techniques may be used to determine spatial locations or points parts of an object. In this regard, first machine learning model 140-1 may be configured to detect keypoints for passengers, for passenger seats, and for passenger restraints, as discussed herein. The keypoints may be example features that may be detected by first machine learning model 140-1. Other features may include corners, ridges, blobs, and/or edges, among other examples. In some situations, first machine learning model 140-1 may be a deep learning model. In some implementations, the segmentation and the keypoint detection may be performed by one or more additional machine learning models.

In some implementations, first machine learning model 140-1 may be trained using training data that include historical video data of passengers of different ages, passengers of different sizes, passenger seats of different types, passenger seats of different sizes, passenger seats of different shapes, passenger restraints of different shapes, among other examples.

Second machine learning model 140-2 may be a machine learning model trained to determine actions performed by passengers based on an output of the one or more object recognition techniques. By training the machine learning model over multiple frames, observed actions such as behaviors, gestures and the like can be learned from relative motion from frame to frame. For example, based on a result of processing one or more image frames using the one or more object recognition techniques, second machine learning model 140-2 may determine whether passengers are securing themselves using passenger restraints, whether the passengers are releasing the passenger restraints, whether passengers are seeking assistance with the passenger restraints, among other examples. In this regard, second machine learning model 140-2 may be a true action recognition model. For example, second machine learning model 140-2 may implement an action recognition technique.

Second machine learning model 140-2 may be trained using training data that includes historical video data regarding passengers of different sizes that are properly secured by passenger restraints, passengers of different sizes that are not properly secured by passenger restraints, among other examples.

In some implements, the features of video data may be used to determine whether passengers are properly secured by passenger restraints or are improperly secured by passenger restraints. For example, distances between keypoints on passenger restraints may be used to determine whether passengers are properly secured by passenger restraints or are improperly secured by passenger restraints. For example, distances between and/or orientation of keypoints on different body parts of passengers may be used to determine whether passengers are properly secured by passenger restraints or are improperly secured by passenger restraints.

In some examples, restraint verification platform 135 may train first machine learning model 140-1 and/or second machine learning model 140-2. Additionally, or alternatively, a different device may generate and train first machine learning model 140-1 and/or second machine learning model 140-2.

In some implementations, restraint verification platform 135 may utilize rules and logic to determine whether passengers are properly secured by passenger restraints or are improperly secured by passenger restraints. For example, one rule may indicate that a passenger of a first size is properly secured by a passenger restraint based on a first pose and/or a first orientation of the passenger. Another rule may indicate that a passenger of a second size is properly secured by a passenger restraint based on a second pose of the passenger and based on a length of the passenger restraint.

A sensor device 145 may include one or more devices configured to generate sensor data regarding an operation of passenger 110. For example, the sensor device 145 may include a seat sensor device configured to generate sensor data indicating whether passenger 130 is sitting on passenger seat 110. Additionally, the sensor device 145 may include a clasping sensor device configured to generate sensor data indicating whether the passenger restraint is locked and secured (e.g., sensor data indicating whether the seat belt is buckled).

Additionally, the sensor device 145 may include a proximity sensor device configured to generate sensor data indicating a distance between passenger seat 110 and passenger restraint 115. For example, if passenger restraint 115 is a lap bar, the sensor data may indicate a distance between passenger restraint 115 and a lap of passenger 130. Alternatively, if passenger restraint 115 is an over-the-shoulder restraint, the sensor data may indicate a distance between passenger restraint 115 and a shoulder of passenger 130. Alternatively, if passenger restraint 115 is a rear restraint, the sensor data may indicate a distance between passenger restraint 115 and a back of passenger 130. In some implementations, the proximity sensor device may include a light detection and ranging (LiDAR) device.

The sensor device 145 may provide the sensor data to restraint verification platform 135 periodically (e.g., every minute, every three minutes, every five minutes, among other examples). Additionally, or alternatively, the sensor device 145 may provide the sensor data to restraint verification platform 135 based on a trigger (e.g., based on a request from restraint verification platform 135).

Client device 150 may include one or more devices configured to receive notifications from restraint verification platform 135 and cause an operator to provide assistance passengers to enable the passengers to be properly secured by passenger restraints. In some examples, client device 150 may be a device of an operator at a venue, of a flight attendant, of an operator of the vehicle, among other examples. The notifications may cause client device 150 to control an operation of the vehicle.

Figure 1B:
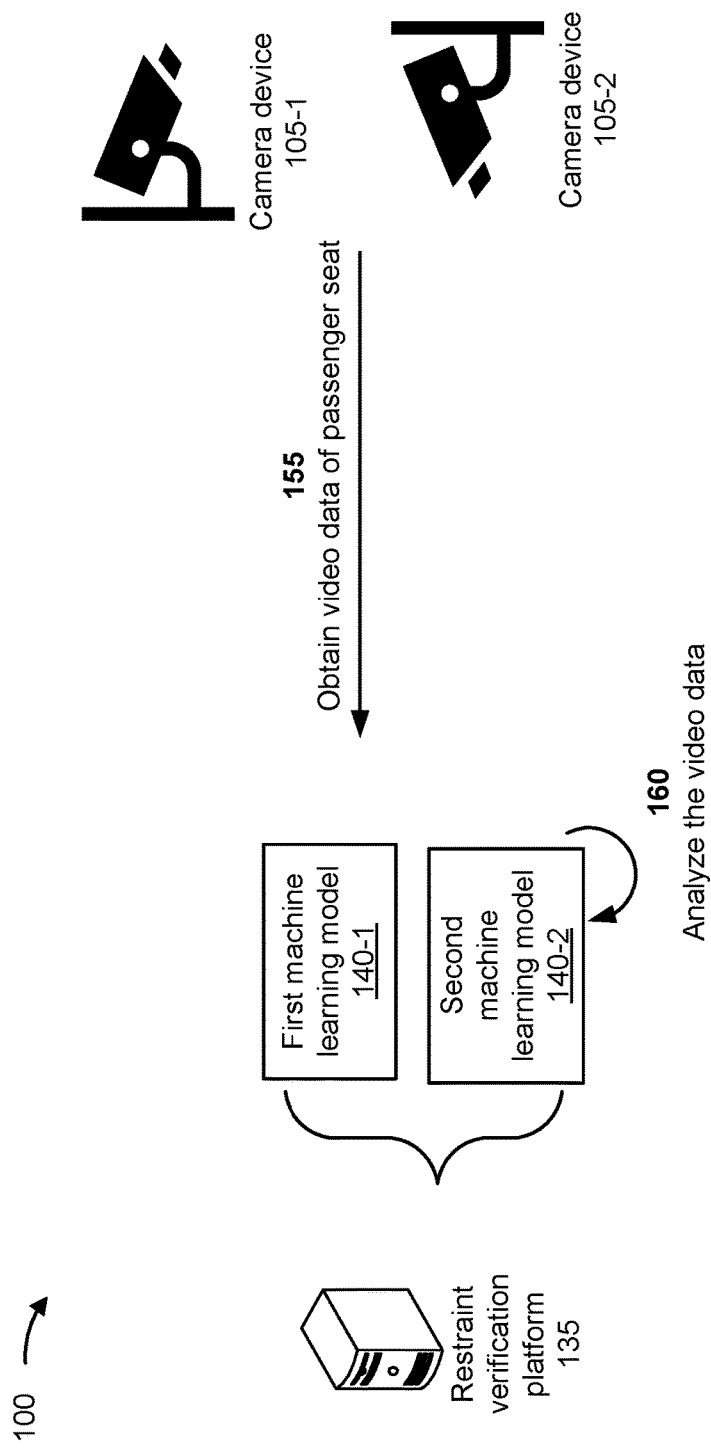

As shown in FIG. 1B, and by reference number 155, restraint verification platform 135 may obtain video data of passenger seat 110. For example, restraint verification platform 135 may receive the video data from one or more camera devices 105 (e.g., camera device 105-1 and/or camera device 105-2). In some examples, restraint verification platform 135 may receive the video data as a continuous video feed. Additionally, or alternatively, restraint verification platform 135 may receive the video data periodically (e.g., every second, every ten seconds, every thirty seconds, among other examples). Additionally, or alternatively, restraint verification platform 135 may receive the video data based on a trigger (e.g., based on a request provided by restraint verification platform 135 to camera device 105-1 or based upon a sensor indicating proximity of a passenger or other environmental condition that warrants collecting video data).

In some situations, restraint verification platform 135 may receive the video data from one or more additional camera devices 105 located at the environment. Additionally, or alternatively to receiving the video data, restraint verification platform 135 may receive audio data associated with the video data. Restraint verification platform 135 may receive the audio data via a microphone integrated with camera device 105-1. Additionally, or alternatively, restraint verification platform 135 may receive the audio data via a microphone, separate from camera device 105-1, that is provided in the environment.

As shown in FIG. 1B, and by reference number 160, restraint verification platform 135 may analyze the video data. For example, based on receiving the video data, restraint verification platform 135 may analyze one or more frames of the video data using one or more object recognition techniques (e.g., analyze the video data using first machine learning model 140-1). For example, first machine learning model 140-1 may receive the video data as input and may provide, as an output, information identifying passenger seat 110, passenger restraint 115, and passenger 130.

In some examples, restraint verification platform 135 (e.g., using first machine learning model 140-1) may analyze the video data to detect passenger seat 110, passenger restraint 115, and passenger 130. In some examples, restraint verification platform 135 (e.g., using first machine learning model 140-1) may analyze the video data using the keypoint detection technique (of first machine learning model 140-1) to determine keypoints of passenger seat 110, of passenger restraint 115, and/or of passenger 130.

Figure 1C:
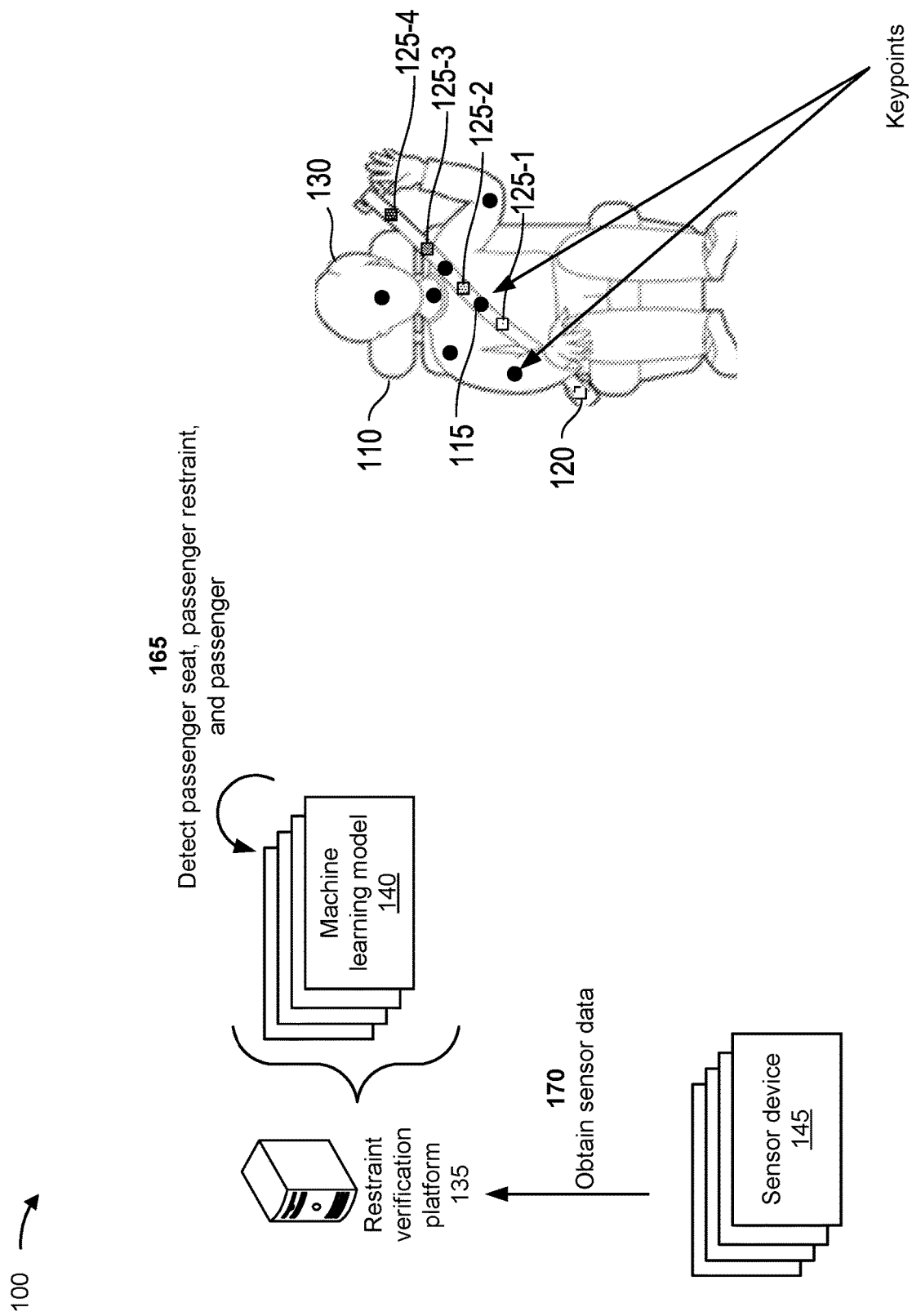

For instance, first machine learning model 140-1 may analyze individual frames of the video data to detect keypoints in each frame of the video frame. As shown in FIG. 1C, first machine learning model 140-1 may analyze a particular frame of the video data to determine (as the keypoints) different parts of passenger seat 110, different parts of passenger restraint 115, a face of passenger 130, a neck of passenger 130, shoulders of passenger 130, elbows of passenger 130, wrists of passenger 130, hips of passenger 130, and so on.

In some implementations, restraint verification platform 135 may analyze the keypoints using the pose estimation technique (of first machine learning model 140-1). As a result of analyzing the keypoints using the pose estimation technique, restraint verification platform 135 may determine a pose and/or an orientation of passenger 130. Restraint verification platform 135 (e.g., using second machine learning model 140-2) may determine an action performed by passenger 130 based on the pose and/or the orientation of passenger 130. In some situations, restraint verification platform 135 may analyze the pose and/or the orientation, using the action recognition technique (of second machine learning model 140-2), to determine the action. For example, restraint verification platform 135 may determine whether passenger 130 is interacting with passenger restraint 115 in order to be secured by passenger restraint 115, whether passenger 130 is interacting with passenger restraint 115 in order to release passenger restraint 115, among other examples.

As shown in FIG. 1C, and by reference number 165, restraint verification platform 135 may detect passenger seat 110, passenger restraint 115, and passenger 130. For example, based on analyzing the video data as described herein, restraint verification platform 135 may detect passenger seat 110, passenger restraint 115, and passenger 130.

As shown in FIG. 1C, and by reference number 170, restraint verification platform 135 may obtain sensor data. For example, restraint verification platform 135 may obtain the sensor data from one or more sensor devices 145. In some implementations, restraint verification platform 135 may use the sensor data to confirm the detection of passenger seat 110, passenger restraint 115, and passenger 130. Additionally, or alternatively, restraint verification platform 135 may use the sensor data to confirm whether passenger restraint 115 is properly securing passenger 130 in passenger seat 110. Additionally, or alternatively, restraint verification platform 135 may use the sensor data to determine whether the one or more sensor devices are experiencing a fault.

Figure 1D:
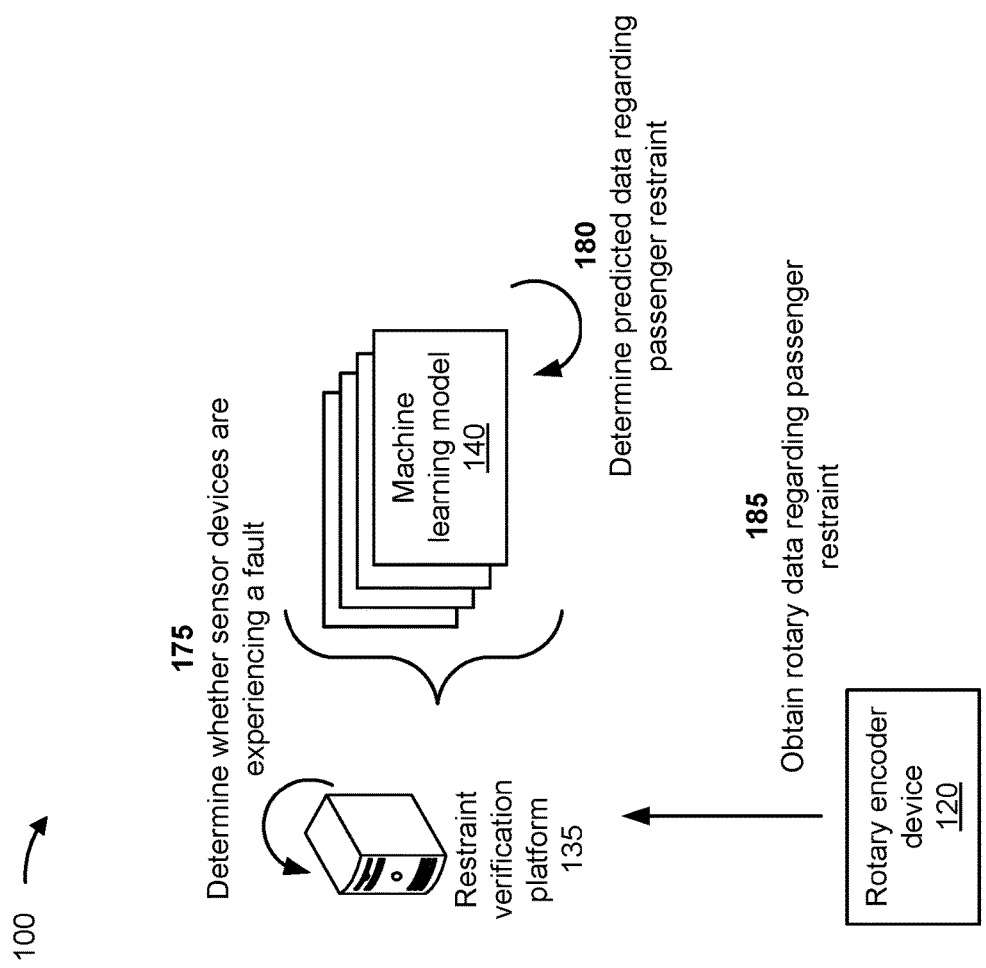

As shown in FIG. 1D, and by reference number 175, restraint verification platform 135 may determine whether the sensor devices are experiencing a fault. For example, after receiving the sensor data, restraint verification platform 135 may use the sensor data to determine whether the one or more sensor devices 145 are experiencing a fault.

In some implementations, restraint verification platform 135 may compare the sensor data and a result of the analysis of the video data. For example, if the sensor data is obtained from a seat sensor device and the sensor data indicates that a passenger has been detected on passenger seat 110, restraint verification platform 135 may confirm the detection of passenger 130 based on the analysis of the video. Alternatively, if the sensor data sensor data indicates that a passenger has not been detected on passenger seat 110, restraint verification platform 135 may determine that the seat sensor device is experiencing a fault.

For example, if the sensor data is obtained from a proximity sensor device, if the sensor data indicates a distance between passenger restraint 115 and a body part of passenger130, and if the distance is consistent with a distance between passenger restraint 115 and a body part of passenger 130 determine using visual indicators 125, restraint verification platform 135 may confirm the distance determined using visual indicators 125 is accurate. Alternatively, if the distance indicated by the sensor data is different than the distance determined using visual indicators 125, restraint verification platform 135 may determine that the seat sensor device is experiencing a fault.

In other words, if the sensor data of a sensor device 145 confirms (or is consistent with) the result of the analysis of the video data, restraint verification platform 135 may determine that the result of the analysis of the video data is accurate and/or that the sensor device 145 is operating properly and/or that the result of the analysis of the video data is accurate. Alternatively, if the sensor data of a sensor device 145 does not confirm (or is inconsistent with) the result of the analysis of the video data, restraint verification platform 135 may determine that the sensor device 145 is experiencing a fault, the analysis of the video data is at fault, or both are at fault.

In some implementations, restraint verification platform 135 may generate a score indicating a measure of accuracy of the sensor device 145. For example, restraint verification platform 135 may generate a first score indicating a first measure of accuracy of the sensor device 145 if the sensor data confirms the result of the analysis of the video data.

Alternatively, restraint verification platform 135 may generate a second score indicating a second measure of accuracy of the sensor device 145 if the sensor data is inconsistent with the result of the analysis of the video data. The first score may exceed the second score and the first measure of accuracy may exceed the second measure of accuracy. In some implementations, if restraint verification platform 135 determines that the senso device 145 is experiencing fault, restraint verification platform 135 may provide a notification to cause the sensor device 145 to be replaced and/or to be serviced. For example, restraint verification platform 135 may provide the notification to client device 150.

As shown in FIG. 1D, and by reference number 180, restraint verification platform 135 may determine predicted data regarding passenger restraint 115. For example, based on the analysis of the video data, restraint verification platform 135 may determine an amount of visible passenger restraint (e.g., an amount of passenger restraint 115 that is visible). In some situations, restraint verification platform 135 may use linear algebra projection methods to determine the amount of visible passenger restraint 115.

The projection methods may help convert portions of passenger restraint from a two-dimensional shape (or planar) to a three-dimensional shape. For example, the projection methods may be used to determine a predicted length of passenger restraint 115. In some examples, the projection methods may be used to determine a curvature of passenger restraint 115 (e.g., a seat belt) and the curvature may be used to determine the predicted length of the passenger restraint 115.

Additionally, or alternatively to using the projection methods, restraint verification platform 135 may use one or more visual indicators 125 to determine the predicted length of passenger restraint 115. As explained herein, each visual indicator 125 may indicate a respective length of passenger restraint 115.

As shown in FIG. 1D, and by reference number 185, restraint verification platform 135 may obtain rotary data regarding passenger restraint 115. In some implementations, restraint verification platform 135 may obtain the rotary data from rotary encoder device 120 associated with passenger seat 110. The rotary data may indicate a measured amount of passenger restraint 115 extended (e.g., a measured length of passenger restraint 115 extended). The rotary data and rotary encoder device 120 are examples of a type of data and a type of measuring device that may be used to indicate the measured amount of passenger restraint 115 extended. In some examples, other types of data and/or other types of measuring devices such as linear encoders, optical encoders, linear transducers, potentiometers, proximity sensors, measurement devices, and the like may be used to measure the amount of passenger restraint 115 extended.

Figure 1E:
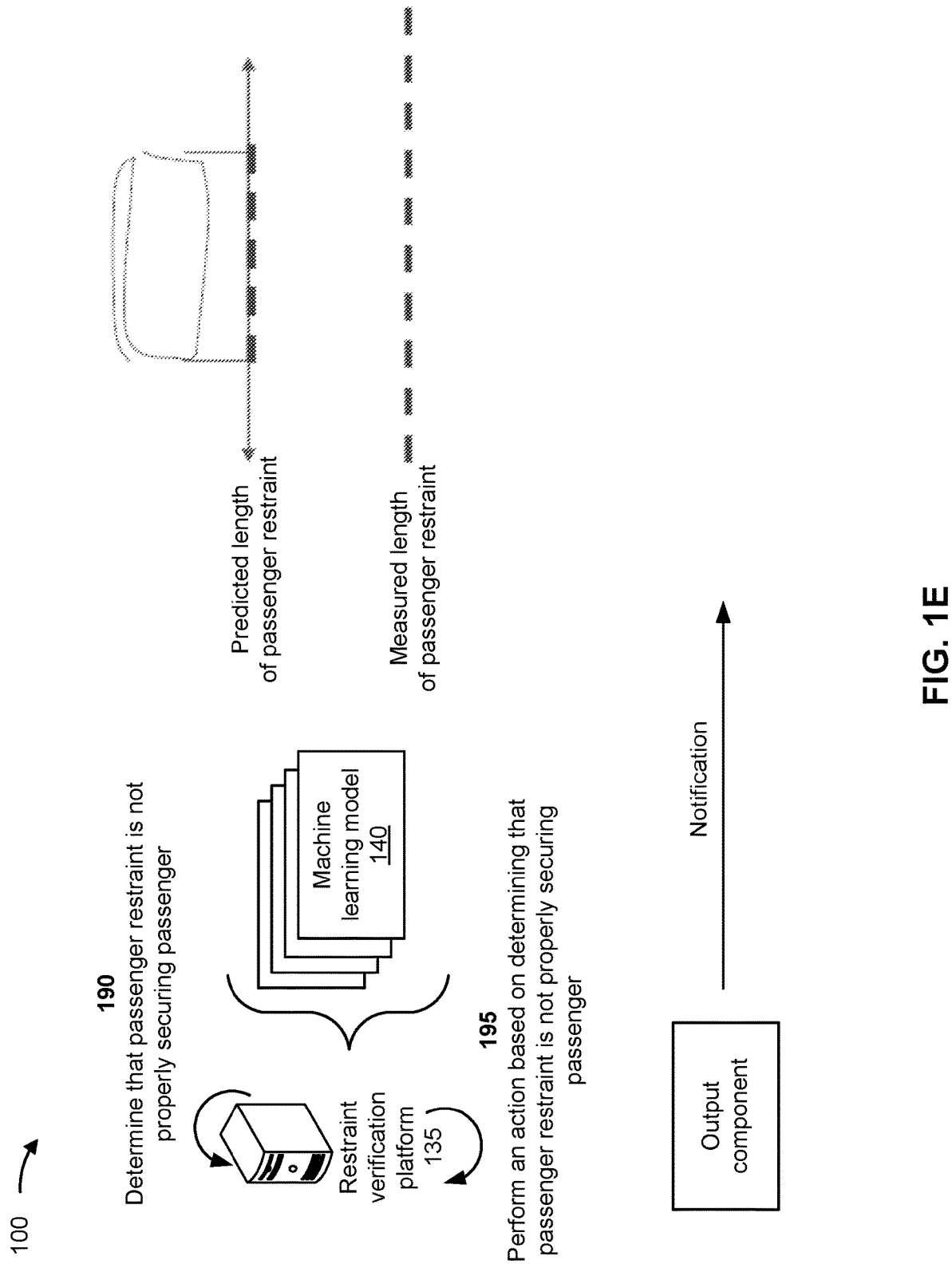

As shown in FIG. 1E, and by reference number 190, restraint verification platform 135 may determine that passenger restraint 115 is not properly securing passenger 130. For example, restraint verification platform 135 may compare the measured length of passenger restraint 115 and the predicted length of passenger restraint 115 to determine whether the seat belt is properly used to properly secure the passenger in the passenger seat.

For example, based on the comparison, restraint verification platform 135 may determine whether the measured length of passenger restraint 115 corresponds to the predicted length of passenger restraint 115. For instance, if the system determines that the measured length of passenger restraint 115 exceeds the predicted length of passenger restraint 115, restraint verification platform 135 may determine that passenger restraint 115 has been excessively extended and that passenger 130 is not properly secured in passenger seat 100. In other words, restraint verification platform 135 may determine that passenger restraint 115 has been excessively extended if the length of passenger restraint 115 extended exceeds a length corresponding to the amount of visible passenger restraint 115.

As shown in FIG. 1E, and by reference number 195, restraint verification platform 135 may perform an action based on determining that passenger restraint 115 is not properly securing passenger 130. In some examples, the action may include immobilizing the vehicle. Additionally, the action may include providing a notification to client device 150 indicating that passenger restraint 115 is not properly securing passenger 130. As shown in FIG. 1E, in some situations, example implementation 100 may include an output component. The output component may include a display, a speaker, and/or one or more light-emitting diodes, among other devices. The output component may be configured to provide the notification indicating that passenger restraint 115 is not properly securing passenger 130. Additionally, or alternatively, the output component may be configured to provide another notification indicating that passenger restraint 115 is properly securing passenger 130. The notifications, provided by the output component, may be a light, a text, and/or a sound, among other examples.

Implementations described herein improve current techniques of verifying proper use of a passenger restraint by using video analytics in conjunction with data from multiple device to determine whether the passenger is properly using the passenger restraint. By combining the analysis of video data and the analysis of the additional data, implementations described herein augment a scene such that less visible elements become readily observable by cameras such that the VA systems can apply existing analysis processes to previously hidden features. For example, less visible elements become readily observable by camera devices that are used for analysis processes to previously hidden features.

Comparing the predicted length of the passenger restraint and the measured length of the passenger restraint ensures that the amount of belt extended is consistent between the rotary encoder device (or the other types of measuring devices) and restraint verification platform 135. Restraint verification platform 135 may alert the operator if a disagreement between the multiple sources.

In some implementations, restraint verification platform 135 may ensure that passengers are loaded into a vehicle in an appropriate manner. For example, children are secured on inside seats and adults are on the outside seats. Implementations described herein do not fall prone to the potential of repetition or fatigue encountered by current techniques for verifying the passenger restraint is properly securing the passenger.

As indicated above, FIGS. 1A-1E are provided as an example. Other examples may differ from what is described with regard to FIGS. 1A-1E. The number and arrangement of devices shown in FIGS. 1A-1E are provided as an example. In practice, there may be additional devices, fewer devices, different devices, or differently arranged devices than those shown in FIGS. 1A-1E. Furthermore, two or more devices shown in FIGS. 1A-1E may be implemented within a single device, or a single device shown in FIGS. 1A-1E may be implemented as multiple, distributed devices. Additionally, or alternatively, a set of devices (e.g., one or more devices) shown in FIGS. 1A-1E may perform one or more functions described as being performed by another set of devices shown in FIGS. 1A-1E.

Figure 2:
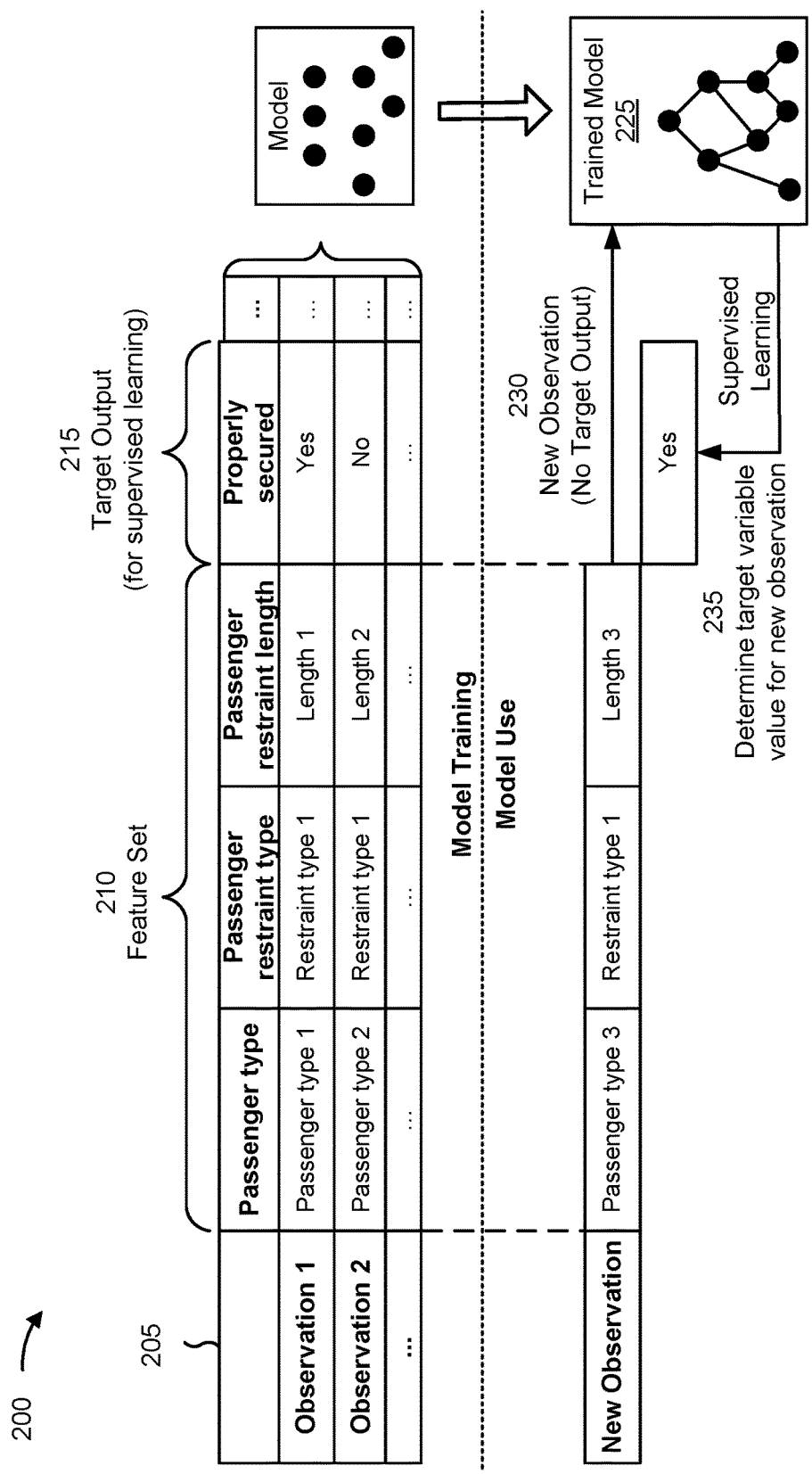
FIG. 2 is a diagram illustrating an example of training and using a machine learning model in connection with verifying proper usage of passenger restraints.

FIG. 2 is a diagram illustrating an example 200 of training and using a machine learning model in connection with verifying proper usage of passenger restraints. The machine learning model training and usage described herein may be performed using a machine learning system. The machine learning system may include or may be included in a computing device, a server, a cloud computing environment, or the like, such as camera devices 105, restraint verification platform 135, and/or client device 150.

As shown by reference number 205, a machine learning model may be trained using a set of observations. The set of observations may be obtained from training data (e.g., historical data and/or simulation data), such as data gathered during one or more processes. In some implementations, the machine learning system may receive the set of observations (e.g., as input) from camera devices 105.

As shown by reference number 210, the set of observations may include a feature set. The feature set may include a set of values, and a value may be referred to as a feature. A specific observation may include a set of values. In some implementations, the machine learning system may determine values for a set of observations and/or values for a specific observation based on input received from camera devices 105. For example, the machine learning system may identify a feature set (e.g., one or more features and/or feature values) by extracting the feature set from structured data, by performing natural language processing to extract the feature set from unstructured data, and/or by receiving input from an operator.

As an example, a feature set for a set of observations may include a first feature set of passenger type, a second feature set of passenger restraint type, a third feature set of passenger restraint length, and so on. As shown, for a first observation, the first feature set is labeled "Passenger type 1," the second feature set is labeled "Restraint type 1," the third feature set is labeled "Length 1," and so on. These features sets are provided as examples, and may differ in other examples. For example, the feature set may include more features, less features, or different features than the features identified in FIG. 2. Feature set "Passenger type 1" contains data representing features extracted from Observation 1 that pertain to a passenger represented in the observation, e.g., age, size, body shape, and the like. Feature set "Restraint type 1" contains data representing features extracted from Observation 1 that pertain to the type of passenger restraint, e.g., a seat belt, an over-the-shoulder restraint, a vest restraint, among other examples. Feature set "Length 1" contains data representing features extracted from Observation 1 that pertain to the length of the passenger restraint.

As shown by reference number 215, the set of observations may be associated with a target output. The target output may be represented by a numeric value, may represent a numeric value that falls within a range of values or has some discrete possible values, may represent a value that is selectable from one of multiple options (e.g., one of multiples classes, classifications, or labels) and/or may represent a Boolean value. A target output may be specific to an observation. In example 200, the target output is Properly secured, which has a value of "Yes" for the first observation. In other words, the first observation may indicate that the passenger is properly secured by the passenger restraint. Accordingly, the machine learning model may be trained, based on the feature set, to classify the observation as properly secured or improperly secured.

The target output may represent an output that a machine learning model is being trained to predict, and the feature sets may represent the inputs used to a train a machine learning model. The set of observations may be labeled or otherwise associated with target output values so that the machine learning model can be trained to recognize patterns in the feature set that lead to a target output. A machine learning model that is trained to predict a target output value from labeled observations may be referred to as a supervised learning model.

In some implementations, the machine learning model may be trained on a set of observations that are not labeled with a target output. This may be referred to as an unsupervised learning model. In this case, the machine learning model may learn patterns from the set of observations without labeling or supervision, and may provide output that indicates such patterns, such as by using clustering and/or association to identify related groups of items within the set of observations.

As shown by reference number 220, the machine learning system may train a machine learning model using the feature sets 210 extracted from the observations 205 and using one or more machine learning algorithms, such as a regression algorithm, a decision tree algorithm, a neural network algorithm, a k-nearest neighbor algorithm, a support vector machine algorithm, or the like. After training, the machine learning system may store the machine learning model as a trained machine learning model (Trained Model 225) to be used to analyze new observations.

As shown by reference number 230, once trained, the machine learning system may apply Trained Model 225 to a new observation, such as by receiving a new observation and inputting the new observation to Trained Model 225. As shown, the new observation may include a first feature set of Passenger type 3, a second feature set of Passenger restraint type 1, a third feature set of Length 3, and so on, as an example. The machine learning system may apply Trained Model 225 to the new observation to generate an output (e.g., a result). The type of output may depend on the type of machine learning model and/or the type of machine learning task being performed. For example, the output may include a predicted value of a target output, such as when supervised learning is employed.

As an example, Trained Model 225 may predict a value of "Yes" for the target variable of "Properly secured" for the new observation, as shown by reference number 235. Based on this prediction, the machine learning model may provide a first recommendation, may provide output for determination of a first recommendation, may perform a first automated action, and/or may cause a first automated action to be performed (e.g., by instructing another device to perform the automated action), among other examples. The first recommendation may include, for example, dispatching a vehicle that the passenger has boarded if a value for the target variable of "Properly secured" is "Yes" (in other words, if the passenger is properly secured). The first automated action may include, for example, providing a notification to the device of the operator to cause the operator to dispatch the vehicle.

In this way, the restraint verification platform 135 may apply a rigorous and automated process to provide a response to whether a passenger is properly secured by a passenger restraint. The machine learning system enables recognition and/or identification of tens, hundreds, thousands, or millions of features and/or feature values for tens, hundreds, thousands, or millions of observations, thereby increasing accuracy and consistency and reducing delay associated with responding to observable events by human operators manually directing response.

As indicated above, FIG. 2 is provided as an example.

Figure 3:
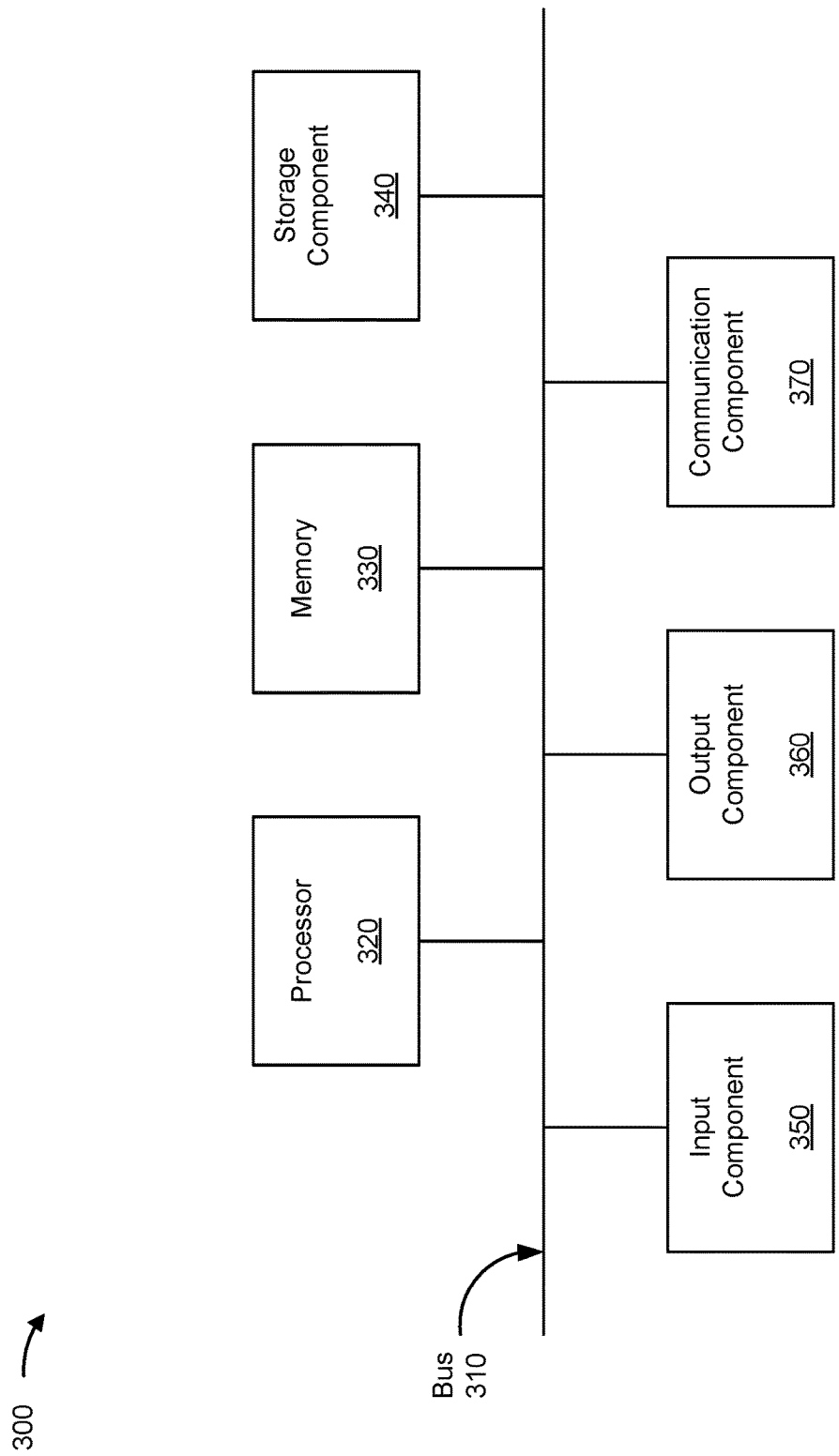
FIG. 3 is a diagram of example components of one or more devices of FIG. 1.

FIG. 3 is a diagram of example components of a device 300, which may correspond to camera devices 105, rotary encoder device 120, restraint verification platform 135, sensor devices 145, and/or client device 130. In some implementations, camera devices 105, rotary encoder device 120, restraint verification platform 135, sensor devices 145, and/or client device 130 may include one or more devices 300 and/or one or more components of device 300. As shown in FIG. 3, device 300 may include a bus 310, a processor 320, a memory 330, a storage component 340, an input component 350, an output component 360, and a communication component 370.

Bus 310 includes a component that enables wired and/or wireless communication among the components of device 300. Processor 320 includes a central processing unit, a graphics processing unit, a microprocessor, a controller, a microcontroller, a digital signal processor, a field-programmable gate array, an application-specific integrated circuit, and/or another type of processing component. Processor 320 is implemented in hardware, firmware, or a combination of hardware and software. In some implementations, processor 320 includes one or more processors capable of being programmed to perform a function. Memory 330 includes a random access memory, a read only memory, and/or another type of memory (e.g., a flash memory, a magnetic memory, and/or an optical memory).

Storage component 340 stores information and/or software related to the operation of device 300. For example, storage component 340 may include a hard disk drive, a magnetic disk drive, an optical disk drive, a solid state drive, a compact disc, a digital versatile disc, and/or another type of non-transitory computer-readable medium. Input component 350 enables device 300 to receive input, such as guest input and/or sensed inputs. For example, input component 350 may include a touch screen, a keyboard, a keypad, a mouse, a button, a microphone, a switch, a sensor, a global positioning system component, an accelerometer, a gyroscope, and/or an actuator. Output component 360 enables device 300 to provide output, such as via a display, a speaker, and/or one or more light-emitting diodes. Communication component 370 enables device 300 to communicate with other devices, such as via a wired connection and/or a wireless connection. For example, communication component 370 may include a receiver, a transmitter, a transceiver, a modem, a network interface card, and/or an antenna.

Device 300 may perform one or more processes described herein. For example, a non-transitory computer-readable medium (e.g., memory 330 and/or storage component 340) may store a set of instructions (e.g., one or more instructions, code, software code, and/or program code) for execution by processor 320. Processor 320 may execute the set of instructions to perform one or more processes described herein. In some implementations, execution of the set of instructions, by one or more processors 320, causes the one or more processors 320 and/or the device 300 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 3 are provided as an example. Device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
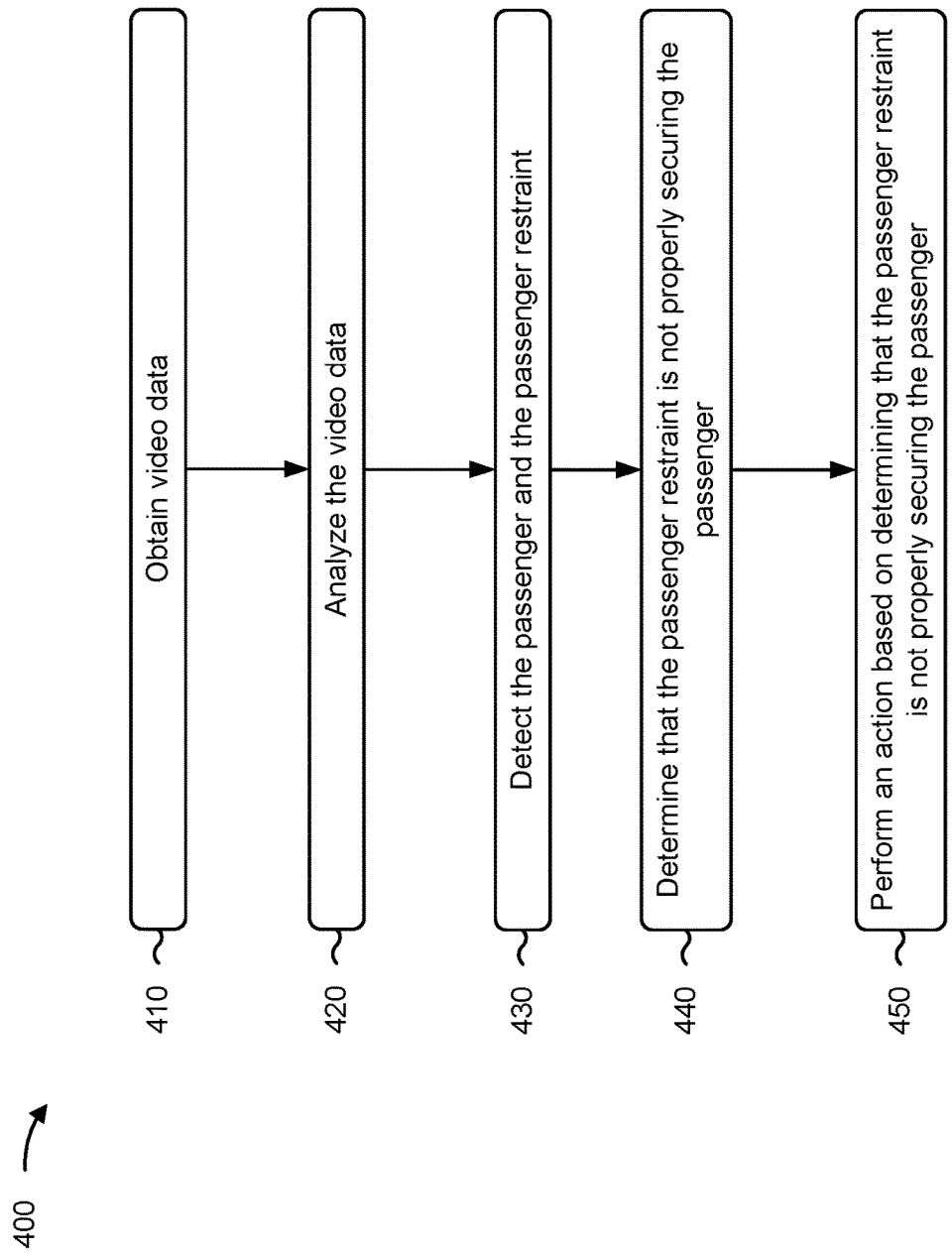
FIG. 4 is a flowchart of an example process relating to verifying proper usage of passenger restraints.

FIG. 4 is a flowchart of an example process 400 relating to verifying proper usage of passenger restraints. In some implementations, one or more process blocks of FIG. 4 may be performed by a restraint verification platform (e.g., restraint verification platform 135). In some implementations, one or more process blocks of FIG. 4 may be performed by another device or a group of devices separate from or including the prediction platform, such as a camera device (e.g., camera device 105-1), a sensor device (e.g., sensor device 145), and/or a client device (e.g., client device 150). Additionally, or alternatively, one or more process blocks of FIG. 4 may be performed by one or more components of device 300, such as processor 320, memory 330, storage component 340, input component 350, output component 360, and/or communication component 370.

As shown in FIG. 4, process 400 may include obtaining video data (block 410). For example, the restraint verification platform may obtain video data of an environment that includes a passenger in a passenger seat of a vehicle. For example, the restraint verification platform may obtain continuous video/audio streaming or alternatively intermittently stream from one or more camera devices 105.

As further shown in FIG. 4, process 400 may include analyzing the video data (block 420). For example, the restraint verification platform may use one or more machine learning models to analyze the video data to identify the features of the passenger seat, of the passenger restraint, and/or of the passenger.

For example, the first machine learning model may identify a first feature set of passenger seats, a second feature set of passenger restraints, a third feature set of passengers, and so on. The features may be represented by values, vectors, or other data structures suitable for the first machine learning model and meet the needs of the application. In some implementations, the features may be identified using one or more techniques, such as an edge detection technique, a primal sketch technique, an edge matching technique, a greyscale matching technique, a gradient matching technique, a pose consistency technique, among other examples. As an alternative, rules, algorithms and/or explicit logic may be used to determine some features either alone or in combination with the first machine learning model.

In some implementations, the video data may be analyzed using a keypoint detection technique to identify a plurality of keypoints of the passenger seat, the passenger restraint, and/or the passenger. In examples, the keypoint detection technique may be based on or may include a scale-invariant feature transform algorithm, a speeded up robust features algorithm, a feature from accelerated segment test algorithm, among other examples. In some implementations, analyzing the video data to determine the keypoints comprises using a pose estimation technique to determine at least one of a pose or an orientation of the passenger seat, the passenger restraint, and/or the passenger. In some implementations, at least one of the pose or the orientation may be determined based on the plurality of keypoints identified using the keypoint detection technique.

In some implementations, the video data may be analyzed using the action recognition technique (e.g., of the second machine learning model) to identify an action performed by the passenger. The action may include interacting with the passenger restraint to secure the passenger to the passenger, releasing the passenger restraint to enable the passenger to be unloaded from the vehicle, among other examples.

The action recognition technique may include a sensor-based activity recognition technique, a Wi-Fi-based activity recognition technique, a vision-based activity recognition technique, a data-mining-based activity recognition technique, among other examples.

The action may be identified based on the features of passenger 130. For example, the action may be identified based on the keypoints identified using the keypoint detection technique. In some examples, identifying the action may include analyzing data from multiple observations over a period of time.

In some implementations, the video data includes a plurality of frames. Analyzing the video data to determine the actual guest behavior and the keypoints comprises analyzing a first frame, of the plurality of frames, and one or more first keypoints of the keypoints to determine the actual guest behavior. Predicting the predicted guest behavior comprises predicting the predicted guest behavior based on the actual guest behavior, a second frame of the plurality of frames, and one or more second keypoints of the keypoints.

As further shown in FIG. 4, process 400 may include detecting the passenger and the passenger restraint (block 430). For example, the restraint verification platform may detect the passenger based on analyzing the video data. In some implementations, the restraint verification platform may detect the passenger based on analyzing the video data using a segmentation technique. In some implementations, the restraint verification platform may confirm that the passenger has been detected based on sensor data from a seat sensor device. The sensor data may indicate that the passenger is detected on the seat.

As further shown in FIG. 4, process 400 may include determining that the passenger restraint is not properly securing the passenger (block 440). For example, the restraint verification platform may determine that the measured length of the seat belt exceeds the predicted length of the seat belt.

As further shown in FIG. 4, process 400 may include performing an action based on determining that the passenger restraint is not properly securing the passenger (block 450). For example, the restraint verification platform may immobilize the vehicle. Additionally, the restraint verification platform may provide a notification. The notification may be a verbal notification, a visual notification, an automated notification, among other examples.

Implementations described herein can also be used to indicate that the vehicle has been cleared for dispatch. For example, the restraint verification platform may be used to determine if the passenger is still secured. If the passenger is not secured, the restraint verification platform may halt the dispatch of the vehicle.

Implementations described herein can also be used for prison transports. Personnel must lock and secure the prisoner in their seat. The restraint verification platform may verify that the guard has adequately secured the prisoner. It can also be used for employers who have company vehicles. The restraint verification platform may monitor and verify that the driver has secured themselves (and the passengers).

In some implementations, the passenger restraint is a passenger seat belt, and determining that the passenger restraint is not properly securing the passenger comprises: determining a length of the passenger seat belt that has been extended; and determining that the passenger restraint is not properly securing the passenger based on the length of the passenger seat belt that has been extended.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

The foregoing disclosure provides illustration and description, but is not intended to be exhaustive or to limit the implementations to the precise forms disclosed. Modifications may be made in light of the above disclosure or may be acquired from practice of the implementations.

As used herein, satisfying a threshold may, depending on the context, refer to a value being greater than the threshold, greater than or equal to the threshold, less than the threshold, less than or equal to the threshold, equal to the threshold, not equal to the threshold, or the like.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method performed by a restraint verification platform, the method comprising:
    obtaining video data of a passenger in a passenger seat;
    analyzing, using one or more machine learning models trained to detect passengers in passenger seats and passenger restraints of the passenger seats, the video data to detect a passenger is in a passenger restraint of the passenger seat;
    determining an extended length that the passenger restraint has been extended;
    determining, based on analyzing the video data, a visible amount of the passenger restraint;
    comparing the extended length and the visible amount of the passenger restraint;
    determining, based on comparing the extended length and the visible amount of the passenger restraint, that the passenger restraint is not properly securing the passenger; and
    performing an action based on determining that the passenger restraint is not properly securing the passenger.

2. The method of claim 1, wherein the passenger restraint is a passenger seat belt comprising a plurality of visual indicators, wherein each of the plurality of visual indicators indicates a respective extended length that the passenger restraint has been extended, including the extended length.

3. The method of claim 1, wherein determining that the passenger restraint is not properly securing the passenger comprises:
    determining the extended length of the passenger restraint is greater than or equal to a length threshold; and
    determining that the passenger restraint is not properly securing the passenger based on the extended length of the passenger restraint being greater than or equal to the length threshold and based on the extended length being greater than the visible amount of the passenger restraint.

4. The method of claim 1, wherein performing the action comprises at least one of:
    preventing movement of a motion base that includes the passenger seat or of a passenger vehicle that includes the passenger seat; or
    providing a notification that the passenger restraint is not properly securing the passenger.

5. The method of claim 1, further comprising:
    wherein determining the extended length comprises:
        obtaining rotary data from a rotary encoder device associated with the passenger restraint, wherein the rotary data indicates a measured length of the passenger restraint; and
    wherein determining that the passenger restraint is not properly securing the passenger comprises:
        corresponding the visible amount to a predicted length of the passenger restraint based on analyzing the video data; and
        comparing the measured length of the passenger restraint and the predicted length of the passenger restraintthe passenger restraint.

6. The method of claim 1, further comprising:
    detecting, based on analyzing the video data, a visual indicator on the passenger restraint,
    wherein the presence of the visual indicator indicates the extended length that the passenger restraint has been extended.

7. The method of claim 1, further comprising:
    obtaining data from a sensor associated with the passenger seat, the data comprising a first indication of a presence of a passenger in the passenger seat;
    analyzing the video data to obtain a second indication of a presence of the passenger in the passenger seat;
    comparing the first indication of the presence of the passenger in the passenger seat with the second indication of the presence of the passenger in the passenger seat;
    determining a measure of accuracy of the data from the sensor based on the comparison; and
    providing a notification associated with the measure of accuracy of the data.

8. A system, comprising:
one or more camera devices configured to obtain video data of a passenger in a passenger seat of a passenger vehicle; and
a restraint verification platform is configured to:
obtain the video data;
analyze, using one or more machine learning models trained to detect passengers in passenger seats and passenger restraints of the passenger seats, the video data to detect the passenger is in a passenger restraint of the passenger seat;
detect, using the one or more machine learning models and based on analyzing the video data, the passenger in the passenger seat and a passenger restraint of the passenger seat;
determine an extended length that the passenger restraint has been extended;
determine, based on analyzing the video data, a visible amount of the passenger restraint;
compare the extended length and the visible amount of the passenger restraint;
determine, based on comparing of the extended length and the visible amount of the passenger restraint, that the passenger restraint is not properly securing the passenger; and
perform an action based on determining that the passenger restraint is not properly securing the passenger.

9. The system of claim 8, wherein, to perform the action, the restraint verification platform is configured to:
prevent movement of the passenger vehicle; or
provide a notification that the passenger restraint is not properly securing the passenger.

10. The system of claim 8, wherein, to determine that the passenger restraint is not properly securing the passenger, the restraint verification platform is configured to:
determine that the passenger restraint is not properly securing the passenger based on the extended length of the passenger restraint being greater than or equal to the length threshold and based on the extended length being greater than the visible amount of the passenger restraint.

11. The system of claim 8, wherein to determine of the extended length, the restraint verification platform is further configured to:
obtain rotary data from a rotary encoder device associated with the passenger restraint, wherein the rotary data indicates a measured length of the passenger restraint; and
to determine that the passenger restraint is not properly securing the passenger, the restraint verification platform is further configured to:
correspond the visible amount to a predicted length of the passenger restraint based on analyzing the video data; and
compare the measured length of the passenger restraint and the predicted length of the passenger restraint.

12. The system of claim 8, wherein, the restraint verification platform is further configured to:
detect, based on analyzing the video data, a visual indicator on the passenger restraint, wherein the presence of the visual indicator indicates the extended length that the passenger restraint has been extended.

13. A non-transitory computer-readable medium storing a set of instructions, the set of instructions comprising:
one or more instructions that, when executed by one or more processors of a device, cause the device to:
obtain video data of a passenger in a passenger seat;
analyze, using one or more machine learning models trained to detect passengers in passenger seats and passenger restraints of the passenger seats, the video data to detect the passenger is in a passenger restraint of the passenger seat;
determine an extended length that the passenger restraint has been extended;
determine, based on analyzing the video data, a visible amount of the passenger restraint;
compare the extended length and the visible amount of the passenger restraint;
determine, based on comparing the extended length and the visible amount of the passenger restraint, that the passenger restraint is not properly securing the passenger; and
perform an action based on determining that the passenger restraint is not properly securing the passenger.

14. The non-transitory computer-readable medium of claim 13, wherein the one or more instructions, that cause the device to perform the action, cause the device to:
provide a notification that the passenger restraint is not properly securing the passenger.

15. The non-transitory computer-readable medium of claim 13, wherein the passenger restraint is a passenger seat belt comprising a plurality of visual indicators, wherein each of the plurality of visual indicators indicates a respective extended length that the passenger restraint has been extended, including the extended length.

16. The non-transitory computer-readable medium of claim 13, wherein the one or more instructions further cause the device to:
train the one or more machine learning models with training data that includes historical video data of passengers in passenger seats
wherein the video data identifies passengers that are properly secured by passenger restraints, and
wherein the video data identifies passengers that are not properly secured by the passenger restraints.

17. The non-transitory computer-readable medium of claim 13, wherein the one or more instructions further cause the device to:
obtain data from a sensor associated with the passenger seat, the data comprising a first indication of a presence of a passenger in the passenger seat;
analyze the video data to obtain a second indication of a presence of the passenger in the passenger seat;
compare the first indication of the presence of the passenger in the passenger seat with the second indication of the presence of the passenger in the passenger seat;
determine a measure of accuracy of the data based on the comparison; and
provide a notification associated with the measure of accuracy of the data.

18. The non-transitory computer-readable medium of claim 17, wherein the one or more instructions further cause the device to:
determine that the data, from the sensor, does not correspond to the video data based on the measure of accuracy of the data based on analyzing the video data, wherein the notification indicates that the sensor is experiencing a fault.

19. The method of claim 1, further comprising:
obtaining data from a sensor associated with the passenger seat, the data comprising a first distance between the passenger restraint and a body part of the passenger;

analyzing the video data to obtain a second distance between the passenger restraint and the body part of the passenger;

comparing the first distance with the second distance;

determining a measure of accuracy of the data from the sensor based on the comparison; and providing a notification associated with the measure of accuracy of the data.

\* \* \* \* \*